3,055,815
POLYETHYLENE COMPOSITIONS
Bernard John Lyons, Norbury, London, England, assignor to British Insulated Callender's Cables Limited, London, England, a British company
No Drawing. Filed June 5, 1959, Ser. No. 818,251
Claims priority, application Great Britain June 20, 1958
9 Claims. (Cl. 204—154)

This invention relates to polyethylene compositions having an increased resistance to oxidation, especially but not exclusively oxidation catalyzed by copper.

The oxidation of many organic compounds is catalyzed by copper, either distributed throughout the compound or in contact with a surface of the compound. Such catalytic oxidation can be inhibited by the incorporation in the organic compound of certain chemical substances, usually referred to as "copper deactivators." A known class of chemical compounds, some of which are known to function in this way, are the chelating compounds made by reacting an aromatic hydroxy aldehyde, in which the hydroxyl group is substituted in a benzene ring in a position ortho- to the aldehyde group, with an alkyl or aryl diamine in which the amine groups are attached to different (preferably adjacent) carbon atoms of a chain or ring of two or more carbon atoms. Of this class of compounds (hereinafter referred to as the class specified), that most widely used as a copper deactivator is the simplest compound of the class, namely 1,2-bis(2-hydroxybenzylidineamino)ethane.

As far as we are aware copper deactivators of this kind have never been added to solid polymers of ethylene, since metallic copper does not catalyze the oxidation of polyethylene to any distinguishable extent at temperatures below the melting point of the polyethylene.

The present invention is based partly on our discovery that oxidation of polyethylene, the molecules of which have been cross-linked by high energy ionizing radiation, is catalyzed by copper to a very marked extent when the irradiated polyethylene is subjected in the presence of copper to high temperatures in oxygen containing atmospheres (that is temperatures above the melting point of solid polymers of ethylene which have not been cross-linked by high energy irradiation) and that such catalytic oxidation is inhibited by the incorporation in the polyethylene of certain chemical compounds within the class specified and partly on our discovery that, when these same or similar compounds are incorporated in polyethylene in conjunction with an amine antioxidant, the resistance of the resultant composition to oxidation, whether or not copper is present, is increased and with most of the compounds this latter effect is obtained even after irradiation.

To obtain a polyethylene composition in accordance with the present invention which is capable of withstanding high temperature and is resistant to copper catalyzed oxidation, by subjecting to ionizing radiation (to the extent that molecular cross-linking takes place) a mixture of polyethylene with a small quantity of a compound of the class specified, it is necessary to select a compound which is not decomposed by oxidation at such temperatures and which is not decomposed by attack by the radicals produced in polyethylene when it is subjected to high energy ionizing radiation to bring about molecular cross-linking. 1,2-bis(2-hydroxybenzylidineamino)ethane does not fulfil these requirements and, considering this as a basic material, the structural modifications of the molecule which we have found effective to convert it into a material having the required properties are, increasing the aromaticity of the molecule and substituting nitro-groups in one or more of the homo or heterocyclic rings in the molecule.

Also, 1,2-bis(2-hydroxybenzylidineamino)ethane, when incorporated in a polythene composition containing an amine antioxidant, does not significantly increase the resistance to oxidation of the composition. However, when nitro groups are introduced into aromatic rings in the molecule a synergistic effect is noticed, that is to say, when the modified compound is used in conjunction with an amine antioxidant, a greater resistance to oxidation than is obtained by use of the amine alone is obtained. The modified compounds do not by themselves act as an antioxidant although, as already stated, many of them act as deactivators to inhibit copper catalyzed oxidation of polythene after irradiation.

In accordance with the invention a polyethylene composition contains a compound having the following general formula (with or without an amine antioxidant):

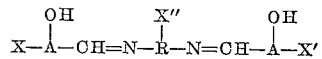

in which

A is a benzene or a homo- or heterocyclic nucleus having a greater aromatic character than a benzene nucleus, e.g. a pyridine, a naphthalene or higher aromatic nucleus, the OH groups being ortho- to the —CH=N groups, R is a straight chain, branched chain or cyclic aliphatic radical or an aromatic or heterocyclic nucleus, in which the N atoms of the above general formula are preferably 1,2 or 1,3 with respect to each other, and X, X' and X'' indicate that A and R each have one or more substituents; these substituents are such that when X'' does not include an $NO_2$ group both X and X' must each include an $NO_2$ group and when substituents other than $NO_2$ are introduced in A or R they are such as not to detract seriously from the effects described above: substituents which satisfy this requirement are halogens.

When the polyethylene composition is to be subjected to irradiation, R must be a benzene or a homo- or heterocyclic nucleus having a greater aromatic character than benzene, e.g. a pyridine, a naphthalene or a higher aromatic nucleus; the composition will normally also contain an antioxidant which survives irradiation. An antioxidant known to have this property is dibetanaphthylparaphenylenediamine.

Examples of the compounds which we prefer are as follows:

EXAMPLES (1) 1,2-bis(3-nitro-2-hydroxybenzylidineamino)4-nitrobenzene
(2) 1,2-bis(5-nitro-2-hydroxybenzylidineamino)4-chlorobenzene
(3) 1,2-bis(5-chloro-2-hydroxybenzylidineamino)4-nitrobenzene Of these we have found Example (1) to be particularly effective. It appears to inhibit copper catalyzed oxidation of polyethylene to a greater extent than the other compounds tested and also in common with most of the other compounds, when used in conjunction with an amine antioxidant, to increase the resistance of the composition to oxidation brought about in other ways, that is oxidation which might take place when the polyethylene is not in the presence of copper.

The amount of copper deactivator added to the polyethylene will vary in accordance with the temperature to which the polyethylene is to be subjected, the amount of copper in or in contact with the polyethylene and to other conditions. It will normally not exceed 5% by weight and as little as .0002% may in some circumstances be effective. In general we prefer to use .01% to 1% when metallic copper is in contact with the polyethylene.

The invention is particularly applicable to the manufacture of electric insulated wires and cables in accordance with British Patent 766,802 and having copper conductors in contact with the irradiated polyethylene insulation or only separated from the polyethylene by a thin surface coating on the copper which is pervious to copper ions and therefore does not substantially inhibit copper catalyzed oxidation of the polyethylene, e.g. a layer of tin applied to the conductor by the conventional dipping process.

The invention is further illustrated by the following details of methods used for preparing some of the deactivators and their precursors and details of tests on samples of polyethylene in accordance with the invention and control samples.

*The mono-nitro-2-hydroxybenzaldehydes.*—A mixture of salicylaldehyde (47.5 g.) and benzene (100 cc.) was warmed to 45° C. and aqueous nitric acid (120 g. of 50% v./v.) added slowly with cooling and stirring to maintain the reaction temperature between 45 and 55° C. The crude reaction product separated as yellow needles M.P. 88–89° C. and is believed to be a mixture of the 3- and 5-nitro isomers. Careful crystallization from benzene yielded both these isomers, M.P. 108–110°C. and 123–125° C. respectively. For the preparation of the deactivators the crude nitration product is used.

*1,2-diamino-4-nitrobenzene* was prepared from 2,4-dinitroaniline by the method described in "Organic Syntheses," vol. 21, page 20 (1941), John Wiley and Sons, New York.

*1,2-bis(3 - nitro-2-hydroxybenzylidineamino)4 - nitrobenzene.*—A hot solution of 1,2-diamino-4-nitrobenzene (0.8 mol) in ethanol was added slowly to a boiling, briskly stirred ethanolic solution of the crude nitro-2-hydroxybenzaldehyde (2 mols). The deactivator separated immediately as fine orange needles M.P. 170° C. (yield 95% on diamine). If the condensation reaction is carried out with 1 mol of diamine to 2 mols of aldehyde, in addition to the above product a far more soluble product M.P. 80–82° C. may be isolated from the mother liquors, the total yield of products being almost quantitative. However, whereas the high melting point product had the desired deactivating properties, the low melting point material had negligible deactivating properties.

*5-chloro-2-hydroxybenzaldehyde.*—Chlorine (1 mol) was bubbled through a solution of salicylaldehyde (1 mol) in acetic acid. The reaction product was thrown out by addition of water and steam distilled to give the 5-chloro isomer, M.P. 98–99° C., in excellent yield.

The copper deactivators used in the following tests were the compound referred to above as the "basic" compound, hereinafter described as "Control I," 1,2-bis(2-hydroxybenzylidineamino)benzene, hereinafter described as "Control II" and those referred to above as Examples (1) to (3). Polyethylene mixes of the following compositions were prepared:

|  | Parts by weight |
|---|---|
| Polyethylene sold under the registered trademark "Alkathene" as "Alkathene 2" | 99 |
| Antioxidant sold under the registered trademark "Nonox" as "Nonox CI" (dibetanaphthylparaphenylenediamine) | 0.5 |
| Copper deactivator (where present) | 0.5 |

Samples of the compounds obtained were pressed into sheets and irradiated in a 400 watt beam of 2 mev. electrons some to a nominal dose of 70 mrads. and some to a nominal dose of 20 mrads.

Strips 6 cm. by 1 cm. of the irradiated sheets were strung on to a clean copper wire and hung in an oven with free access of air at 150° C. Similar strips were aged under the same conditions in the absence of copper. The time that elapsed before oxidative degradation commenced, as indicated by the appearance of bleaching and puckering of the surface of the polyethylene, was noted. The results are given in Table I below. This bleaching and puckering has been found to coincide with the rapid rise in power factor which is characteristic of the end of the induction period with anti-oxidant containing compositions.

*Table I*

| Deactivator | Nominal Dose in mrad. | Time in hours to first appearance of oxidative degradation at 150° C. | |
| --- | --- | --- | --- |
| | | Copper present | Copper absent |
| None | 70 | 170 | 800 |
| None | 20 | 320 | |
| Control I | 70 | 200 | |
| Control II | 20 | 230 | |
| Example 1 | 70 | 1,200 | 1,200 |
| Example 2 | 20 | 1,000 | |
| Example 3 | 20 | 750 | |

It will be noted that the time that elapsed before the onset of degradation in polyethylene containing deactivator (1) was unaffected by the presence of copper and that this time is (50%) greater than that obtained with the antioxidant "Nonox CI" alone in the absence of copper.

The synergistic effect between the compounds referred to above and known amine antioxidants is also illustrated by the effects obtained when polyethylene compositions containing varying quantities of the compound referred to above as Example (1) and each of two amine antioxidants were subjected to oxidation at elevated temperatures. The amine antioxidants used were (A) 3,4-benzphenothiazine and (B) dibetanaphthylparaphenylene-diamine.

The compositions were all given an irradiation dose of 20 mrads. and heated in the presence of copper at 150° C. with the results set out in Table II.

*Table II*

| Deactivator Compound, Example 1, Percent | Amine Antioxidant, Percent | | Time in hours to first appearance of degradation. |
| --- | --- | --- | --- |
| | A | B | |
| Nil | 0.5 | | 400. |
| 0.5 | 0.5 | | None after 1,500 hours. |
| 0.5 | | Nil | 48. |
| Nil | | 0.5 | 300. |
| 0.25 | | 0.75 | 1,000. |
| 0.5 | | 0.5 | 1,200. |
| 0.75 | | 0.25 | 3,000. |

What I claim as my invention is:

1. A polyethylene composition containing .0002–5% of a compound of the general formula

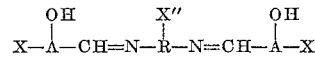

in which the OH groups are ortho to the —CH=N groups and the N atoms are in the 1,2 position with respect to each other; A and R are each selected from the group consisting of benzene and naphthalene; X and X' are each selected from the group consisting of 3-nitro, 3-chloro, 5-nitro and 5-chloro; X" is selected from the group consisting of 4-nitro, 5-nitro, 4-chloro and 5-chloro; and when X" is not a nitro group both X and X' are nitro groups and when at least one of X and X' is a chloro group X" is a nitro group.

2. A polyethylene composition containing .0002–5% of 1,2-bis(3-nitro-2-hydroxybenzylidineamino)-4-nitrobenzene.

3. A polyethylene composition containing .0002–5% of 1,2-bis(5-nitro-2-hydroxybenzylidineamino)-4-chlorobenzene.

4. A polyethylene composition containing .0002–5% of 1,2 - bis(5-nitro-2-hydroxybenzylidineamino)-4-nitrobenzene.

5. A method of making a polyethylene composition which is capable of withstanding high temperatures and is resistant to copper catalyzed oxidation which comprises subjecting to ionizing radiation, to the extent that molecular cross linking takes place, a polyethylene composition as claimed in claim 1 containing an antioxidant which is not subject to degradation when exposed to ionizing radiation.

6. A composition as claimed in claim 1 which contains also a diarylamine antioxidant.

7. A composition as claimed in claim 6 in which the antioxidant is 3,4-benzphenothiazine.

8. A composition as claimed in claim 6 in which the antioxidant is dibetanaphthylparaphenylenediamine.

9. A method of making a polyethylene composition which is capable of withstanding high temperatures and is resistant to copper catalyzed oxidation which comprises subjecting to ionizing radiation, to the extent that molecular cross linking takes place, a polyethylene composition as claimed in claim 1.

References Cited in the file of this patent

UNITED STATES PATENTS

| | | |
|---|---|---|
| 2,181,121 | Downing et al. | Nov. 28, 1939 |
| 2,405,886 | Hardman | Aug. 13, 1946 |

FOREIGN PATENTS

| | | |
|---|---|---|
| 571,943 | Great Britain | Sept. 17, 1945 |